US008827255B2

(12) United States Patent
Woods

(10) Patent No.: US 8,827,255 B2
(45) **Date of Patent: *Sep. 9, 2014**

(54) CLAMP ASSEMBLY

(71) Applicant: Raymond Woods, Traverse City, MI (US)

(72) Inventor: Raymond Woods, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,250

(22) Filed: Jan. 9, 2013

(65) Prior Publication Data

US 2013/0187322 A1 Jul. 25, 2013

Related U.S. Application Data

(60) Provisional application No. 61/588,685, filed on Jan. 20, 2012.

(51) Int. Cl.

| | |
|---|---|
| ***B23Q 3/08*** | (2006.01) |
| ***B25B 1/14*** | (2006.01) |
| ***B25B 5/14*** | (2006.01) |
| ***B25B 5/16*** | (2006.01) |
| ***B25B 5/12*** | (2006.01) |
| ***B25B 5/04*** | (2006.01) |

(52) U.S. Cl.
CPC . *B25B 5/163* (2013.01); *B25B 5/12* (2013.01); *B25B 5/04* (2013.01)
USPC ............................ 269/285; 269/228; 269/120

(58) Field of Classification Search
USPC ................................ 269/32, 24, 27, 228, 120
See application file for complete search history.

(56) References Cited

U.S. PATENT DOCUMENTS 5,924,685 A * 7/1999 Webb ............................ 269/228

* cited by examiner

*Primary Examiner* — Lee D Wilson
*Assistant Examiner* — Nirvana Deonauth
(74) *Attorney, Agent, or Firm* — Gifford, Krass, Sprinkle, Anderson & Citkowski, P.C.

(57) ABSTRACT

A lever-operated clamp having a base, a clamp arm pivotally mounted to the base, and a lever which, upon pivoting, moves the clamp arm in a clamping direction of movement. An internally threaded bolt retainer is mounted to the clamp arm and threadably receives a bolt so that the rotational position of the bolt relative to the bolt retainer varies the position of the bolt relative to the clamp arm. A jam nut or internally threaded knob locks the bolt at its adjusted position.

11 Claims, 1 Drawing Sheet

CLAMP ASSEMBLY

CROSS REFERENCE TO RELATED APPLICATIONS

This application claims priority of U.S. Provisional Application 61/588,685 filed Jan. 20, 2012, the contents of which are incorporated herein by reference.

BACKGROUND OF THE INVENTION

I. Field of the Invention

The present invention relates generally to clamps and, more particularly, to lever-operated clamps.

II. Description of Related Art

There are many previously known lever-operated clamps that are used for temporarily clamping items to a structure. For example, such clamps are oftentimes used for assembly work in order to properly secure and position pieces for assembly during the assembly process. Many of these clamps are sold under the trademark DESTACO, CARR LANE, etc.

These previously known lever-operated clamps typically include a base which is secured to a substructure of some sort. One end of an elongated clamping arm is pivotally mounted to the base so that the clamping arm is movable between a hold and a release position in a circular arc. An elongated lever is pivotally mounted to both the base and the clamping arm and is operable to actuate the clamping arm between its hold and its release position.

Conventionally, an elongated bolt having an elastomeric bumper at one end is adjustably secured to or near the free end of the clamp arm so that the bolt with its attached bumper moves in unison with the clamp arm. The elastomeric bumper is positioned to engage the workpiece desired to be clamped and protects the workpiece from the clamping force.

In order to attach the bolt to the clamp arm, the clamp arm for these previously known clamps typically includes a pair of spaced apart side bars. The elongated bolt extends through the channel formed in between the elongated side walls so that the bumper protrudes outwardly from one side of the clamp arm side walls while the opposite end of the bolt protrudes outwardly from the other side of the channel formed by the clamp arm side bars.

In order to rigidly secure the bolt, and thus the bumper, to the clamp arm, a pair of jam nuts are threadably mounted onto the bolt so that one jam nut is positioned on one side of the clamp arm channel while the other jam nut is positioned on the opposite side. The user then utilizes two wrenches to tighten the jam nuts against the clamp arm thus rigidly securing the bolt and thus the bumper to the clamp arm. The actual extension of the bumper from the clamp arm is adjustable by rotating the bolt through the jam nuts prior to tightening the jam nuts.

A major disadvantage of these previously known clamp assemblies, however, is that a pair of wrenches must be used to secure the bolt with its attached bumper in an adjusted position on the clamp arm. This, in turn, provides for a rather cumbersome adjustment of the bolt with its bumper.

SUMMARY OF THE PRESENT INVENTION

The present invention provides an adjustable quick release clamp assembly which overcomes the above mentioned disadvantages of the previously known clamp assemblies.

In brief, the clamp assembly of the present invention, like the previously known clamp assemblies, includes both a base that is adapted to be secured to a support of some sort as well as a clamp arm which is pivotally mounted to the base. A clamping lever is pivotally mounted to both the clamp arm and the base for actuating the clamp arm between a hold and a release position.

Unlike the previously known clamp assemblies, however, the present invention utilizes a threaded bolt retainer which, upon insertion inside the channel formed between the side bars of the clamp arm, locks the bolt retainer against rotation as well as abuts against one side of the clamp arm. Thereafter, either a quick release knob or jam nut is threadably mounted to the free end of the bolt so that, upon tightening, the bolt with its bumper is rigidly fixed to the clamp arm.

Consequently, unlike the previously known clamp assemblies, the clamp assembly of the present invention can be adjusted and locked into position with either a single wrench or by hand and/or without the use of tools.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
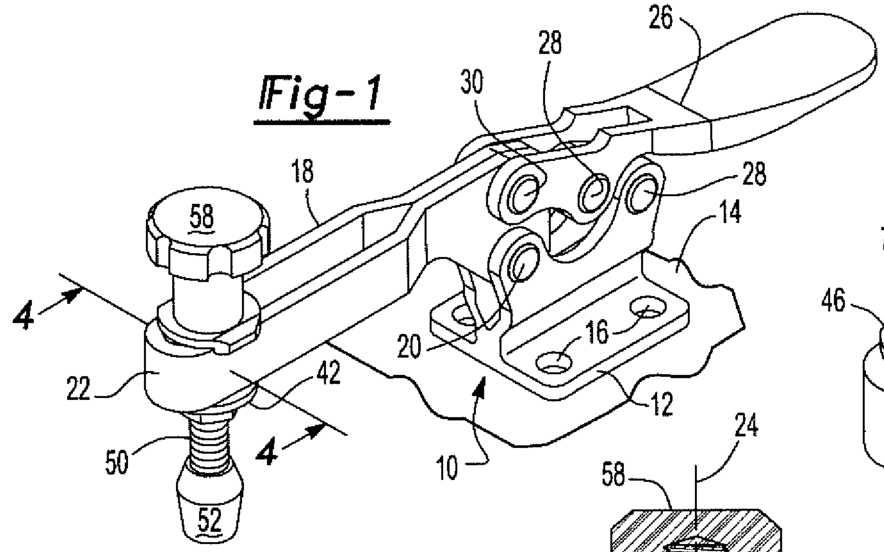
FIG. 1 is an elevational view of a preferred embodiment of the invention.

With reference first to FIG. 1, a first preferred embodiment of the clamp assembly 10 of the present invention is shown. The clamp assembly 10 includes a base 12 which is mounted on a support 14 of some sort. A plurality of openings 16 in the base 12 are provided so that fasteners, such as screws, may be used to secure the base firmly to the support 14.

An elongated clamp arm 18 is pivotally mounted at one end to the base 12 by a pivot pin 20. Consequently, as the clamp arm 18 is pivoted around the pivot pin 20, the other end 22 of the clamp arm 18 moves in a predetermined direction of movement indicated by an arc 24.

A lever 26 is pivotally mounted to the base 12 by a link and pivot pins 28. The pivot pins 28 are spaced apart but parallel to the pivot pin 20 for the clamp arm 18. In addition, the lever 26 is pivotally mounted by a pivot pin 30 to the end of the clamp arm 22 at a position spaced apart but parallel to both the pivot pins 20 and 28. However, alternate pivotal connections between the lever 26, base 12, and clamp arm 18 may also be used.

Figure 4:
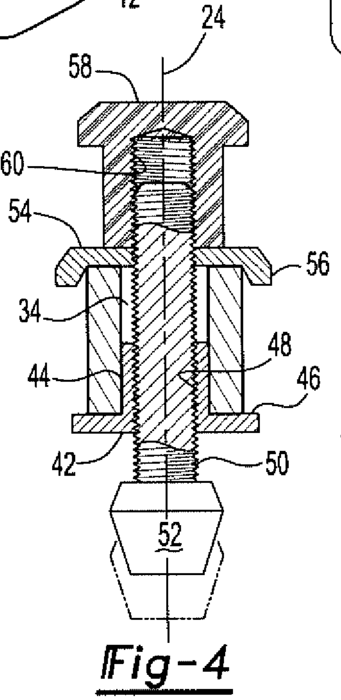
FIG. 4 is a sectional view taken along line 4-4 in FIG. 1 and enlarged for clarity.

Actuation of the lever 26 between the lock position, shown in phantom line in FIG. 4, and the release position, illustrated in solid line in FIG. 4, simultaneously moves the end 22 of the clamp arm 18 along the direction of movement 24 between the release position, illustrated in phantom line, and the lock position, illustrated in solid line.

Figure 3:
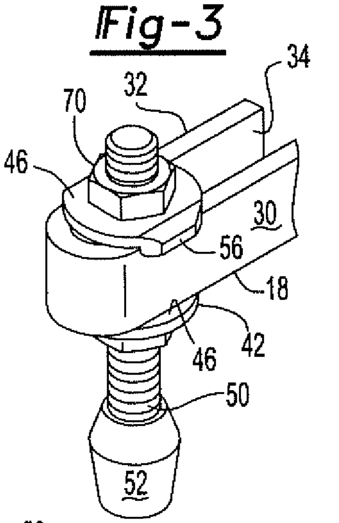
FIG. 3 is a fragmentary elevational view thereof.

As best shown in FIG. 3, the clamp arm 18 includes two spaced apart bars 30 and 32 which form an elongated and generally rectangular channel 34 therebetween. Preferably, this channel 34 has a generally uniform width entirely along its longitudinal length.

Figure 5:
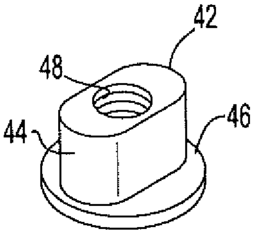
FIG. 5 is an elevational view of a component of the present invention.

As shown in FIGS. 3-5, a bolt retainer 42 has a main body 44 that is snugly positioned within the channel 34 between the clamp arm bars 40. Preferably, the body 44 is press fit, at least manually, into the channel 34 so that the body 44 is frictionally retained to the clamp arm 18. Furthermore, the body 44 has a longitudinal length in the longitudinal direction of the clamp arm 18 that is greater than the width of the channel 34 so that the bolt retainer 42 is locked against rotation relative to the clamp arm 18.

A washer 46, which is preferably a one piece construction with the body 44 of the bolt retainer 42, has a diameter greater than the width of the channel 34 of the clamp arm 18 so that the washer 46 abuts against the bottom of the clamp arm bars 30 and 32 and locks the bolt retainer 42 against movement in the direction of movement 24 of the clamp arm 18.

Figure 2:
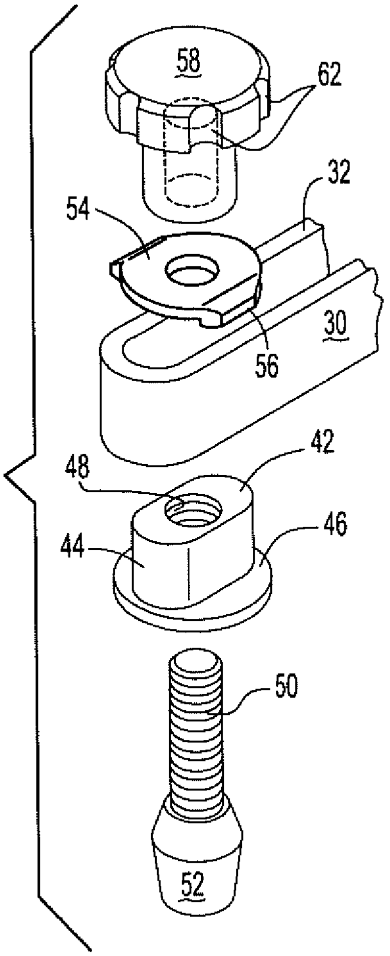
FIG. 2 is a fragmentary exploded view thereof.

Referring now particularly to FIGS. 2, 4, and 5, the bolt retainer 42 includes an internally threaded bore 48 having an axis substantially aligned with the direction of movement 24 of the clamp arm 18. A bolt 50, preferably having a bumper 52 at one end, is then threadably attached to the internally threaded bolt retainer 42. Consequently, the outward extension of the bumper 52 from the clamp arm 18 varies as a function of the rotational position of the bolt 50 relative to the bolt retainer 42.

In order to lock the bolt 50 with its attached bumper at an adjusted axial position, a washer 54 is positioned over the bolt 50 so that the washer abuts against the top of the clamp arm bars 40. This washer 54, furthermore, preferably includes anti-rotation tabs 56 which overlie the outside surface of the clamp arm bars 40 and prevent rotation of the washer 54.

As shown in FIGS. 2 and 4, a locking knob 58 having an internally threaded bore 60 then threadably engages the outwardly extending portion of the bolt 50, i.e. the end of the bolt opposite from the bumper 52. The knob 58 preferably includes a plurality of handgrips 62 so that, upon manually tightening the knob 58 using the handgrips 62, the knob places the bolt 50 under tension and locks the bolt in its longitudinally adjusted position relative to the clamp arm 18.

In operation, with the knob 58 loosened, the bolt 50 is rotated manually until it protrudes outwardly from the clamp arm 18 by the desired amount. The knob 58 is then tightened thus locking the bolt 50 with its bumper 52 in its adjusted position. Thereafter, if readjustment of the position of the bumper 52 is desired, the knob 58 is simply loosened, the bolt 50 and bumper 52 rotated to the new adjusted position, and the knob 58 tightened.

With reference now to FIG. 3, a modification of the present invention is shown. In this modification of the invention, a jam nut 70 replaces the knob 58 of the FIG. 2 embodiment. With the jam nut loosened, the locking bolt 50 with its attached bumper 52 is adjusted to the desired position. Thereafter, the jam nut 70 is tightened by using the appropriate wrench (not shown) thus placing the bolt 50 in tension and locking it against further rotation.

Figure 6:
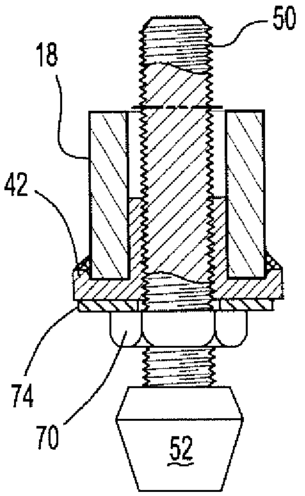
FIG. 6 is a view similar to FIG. 4, but illustrating a modification thereof.

A still further modification of the invention is illustrated in FIG. 6 in which the bolt retainer 42 is optionally secured to the clamp arm 18 by an adhesive, welding, or the like. In addition, a washer 74 is positioned around the bolt 50 between the bumper 52 and the clamp arm 18 and a jam washer 72 is then threadably mounted around the bolt 50 between the bumper 52 and the washer 74. Upon tightening of the jam nut 72, the jam nut 72 locks the bolt 50 with its attached bumper 52 in its adjusted position.

A primary advantage of the embodiment of the invention illustrated in FIG. 6 is that it permits the top of the bolt 50 to be removed as shown in dashed line so that it is substantially flush with the top of the clamp arm 18. Such a configuration would be advantageous for jigs and the like that are used over the long term and without adjustment.

Figure 7:
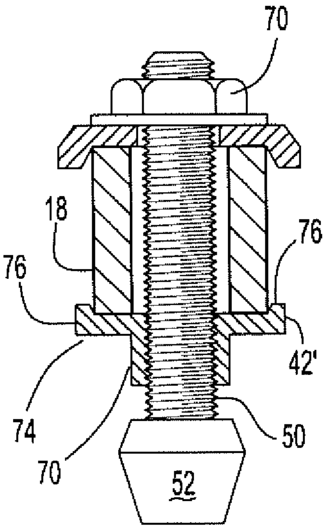
FIG. 7 is a view like FIG. 4, but illustrating a further modification.

With reference now to FIG. 7, an alternative form of the bolt retainer 42' is shown in which the bolt retainer 42' is not positioned within the channel 34 of the clamp arm 18, but rather includes two anti-rotation flanges 76 which overlap the outside of the clamp arm bars 40 and lock the bolt retainer 42' against rotation relative to the clamp arm 18. The modified bolt retainer 42', which may be made of metal, also includes a threaded bore 78 which threadably cooperates with the bolt 50.

From the foregoing, it can be seen that the present invention provides a simple and yet highly effective clamp assembly which may be easily and rapidly adjusted. Having described my invention, however, many modifications thereto will become apparent to those skilled in the art to which it pertains without deviation from the spirit of the invention as defined by the scope of the appended claims.

I claim:

1. A clamp assembly comprising:

a base, an elongated clamp arm pivotally mounted at a first end to said base, said clamp arm having two spaced apart bars which form a rectangular channel therebetween, a lever pivotally secured to said base and said clamp arm at spaced apart pivot axes so that pivotal movement of said lever moves a second end of said clamp arm about a direction of movement, an internally threaded, elongated bolt retainer attached to said clamp arm adjacent said other end, said bolt retainer having a width substantially the same as a spacing between said bars and a length greater than said spacing between said bars so that, with said bolt retainer positioned in said rectangular channel between said bars, said bolt retainer is locked against rotation relative to said bars, but slidably adjustable along the length of said bars, an elongated bolt threadably attached to said bolt retainer so that an axis of said bolt is substantially aligned with said direction of movement, and a lock nut which threadably engages a free end of said bolt and, upon tightening, locks said bolt to said clamp arm.

2. The clamp assembly as defined in claim 1 and comprising an internally hand manipulated threaded knob which threadably engages said bolt and, upon tightening, creates a tensile force between said bolt and said knob.

3. The clamp assembly as defined in claim 2 and comprising a washer disposed between said knob and said clamp arm.

4. The clamp assembly as defined in claim 3 wherein said washer includes at least one anti-rotation tab which prevents rotation of said washer relative to said clamp arm.

5. The clamp assembly as defined in claim 1 and comprising an internally threaded jam nut which threadably engages said bolt and, upon tightening, creates a tensile force between said bolt and said jam nut.

6. The clamp assembly as defined in claim 5 and comprising a washer disposed between said jam nut and said clamp arm.

7. The clamp assembly as defined in claim 6 wherein said washer includes at least one anti-rotation tab which prevents rotation of said washer relative to said clamp arm.

8. The clamp assembly as defined in claim 1 and comprising an elastomeric bumper attached to one end of said bolt.

9. The clamp assembly as defined in claim 4 and comprising an internally threaded jam nut threadably mounted on said bolt between a bumper and said clamp arm wherein, upon tightening of said jam nut, said jam nut abuts against said clamp arm.

10. The clamp assembly as defined in claim 1 wherein said bolt retainer is frictionally secured to said clamp arm.

11. The clamp assembly as defined in claim 1 wherein said bolt retainer is press fit into said clamp arm.

* * * * *